United States Patent Office 2,839,478
Patented June 17, 1958

2,839,478

CELLULAR CARBON MONOXIDE-OLEFINE COPOLYMER-POLYISOCYANATE PRODUCTS AND PROCESS OF PRODUCING SAME

Hugo Wilms, Leverkusen, Otto Bayer, Leverkusen-Bayerwerk, Wilhelm Bunge, Leverkusen, and Ludwig Bruns, Opladen-Lutzenkirchen, Germany, assignors to Farbenfabriken Bayer Aktiengesellschaft, Leverkusen, Germany, a corporation of Germany No Drawing. Application January 18, 1955
Serial No. 482,667

Claims priority, application Germany January 19, 1954

8 Claims. (Cl. 260—2.5)

This invention relates to foamed products and to a process for producing same.

It is known that foamed products can be produced by reacting branched polyesters containing terminal hydroxyl and carboxyl groups, or branched polyesters containing only hydroxyl groups, with diisocyanates or compounds which react as diisocyanates. In the first case the carbon dioxide liberated by the reaction of the carboxyl groups with the isocyanate groups acts as a blowing agent, while in the second case the carbon dioxide necessary for the blowing action is obtained by the reaction of the isocyanate groups with water. The greater the degree of branching of the polyester, the harder are the products obtained by this process; conversely, the lesser the degree of branching the softer and more elastic are the resulting products.

Furthermore, it is known that highly elastic foamed products can be obtained by reacting together, preferably in the presence of an accelerator, strictly linear or only slightly branched polyesters, polyisocyanate and water, the polyisocyanate being employed in an amount in excess of that calculated on the terminal groups. In place of a free polyisocyanate, a compound which reacts as a polyisocyanate may be employed.

A disadvantage inherent in all these known foamed products is that they are saponified quite easily by alkali.

It has now been found that reaction products which are very stable to alkali are obtained by reacting polyhydroxy compounds with polyisocyanates if the polyhydroxy compounds used are hydroxyl group-containing derivatives and preferably hydroxyl group-containing reduction products of copolymers of carbon monoxide and one or more olefines. These hydroxyl group-containing derivatives contain a plurality of functional groups in which one of the functional groups is an hydroxyl group and one of the other functional groups is selected from the class consisting of hydroxyl and carboxyl groups. More particularly, these derivatives may contain only two functional groups in which one is an hydroxyl group and the other is an hydroxyl or a carboxyl group.

The above copolymers, which act as polyketones, are described in German patent specification No. 863,711, United States patent specification No. 2,495,286, and J. Am. Chem. Soc. 74, 1509 (1952). These materials can be reduced by pressure hydrogenation in the presence of catalysts to yield polyalcohols as described in United States patent specification No. 2,495,292. Alternatively, conventional reduction techniques such as the method of Meerwin-Pondorf, using aluminum isopropylate, may be employed in the production of secondary alcohols from such ketones.

Examples of copolymers which are useful as starting materials in the process of the present invention are those derived from carbon monoxide and an olefine such as ethylene, propylene or butylene. Mixtures of olefines of various compositions may also be employed in order to produce copolymers with special properties.

The proportions of carbon monoxide and olefine used determine the hydroxyl content of the products formed by partial or complete hydrogenation of the copolymers and therefore these products require varying amounts of polyisocyanates to convert them into polyurethane foams. In general, copolymers containing about 5–50%, preferably 20–30%, by weight of CO are used as starting materials. Through hydrogenation they yield products containing about 5–10% of hydroxyl groups, which are particularly suitable for use as polyhydroxyl compounds in the process of the invention. By reacting one and the same polyisocyanate with these hydrogenated copolymers, light materials which are cross-linked to a greater or lesser degree having varying properties are produced. All of these light materials are very resistant to alkalies.

Before being reacted with the polyisocyanates, the reduced copolymers can be partially esterified with saturated or unsaturated monocarboxylic acids or dicarboxylic acids.

Instead of using the polyalcohols obtainable by reduction of the above described copolymers other hydroxyl group-containing conversion products of these copolymers may be employed, such as the methylol compounds obtained by reaction of the polyketones with formaldehyde. It is also possible to partially reduce the copolymers and then convert them with formaldehyde into methylol compounds.

When the copolymers containing hydroxyl groups are partially reacted with dicarboxylic acid anhydrides, some of the hydroxyl groups are esterified and a corresponding number of free carboxyl groups are formed at the same time.

Aliphatic, hydroaromatic and aromatic diisocyanates and tri-isocyanates are polyisocyanates suitable for use as starting materials in the process of the present invention. Also suitable are polyisocyanates produced by reacting polyalcohols, polyglycol ethers, or polyesters containing hydroxyl groups, with an amount of a diisocyanate in excess of that calculated on the hydroxyl groups. Instead of the free polyisocyanates, it is also possible to use substances which split off isocyanates and react as free isocyanates at relatively high temperatures, for example phenyl urethanes or the addition products of polyisocyanates with malonic esters or acetoacetic esters.

The amount of polyisocyanate or substance reacting as a polyisocyanate is so chosen that the NCO— groups are at least equivalent to the sum of the hydroxyl groups, the carboxyl groups and water.

The foaming is carried out by conventional methods. Thus, polyhydroxyl compounds containing exclusively free hydroxyl groups as reactive groups are reacted with the polyisocyanate in the presence of water, with or without reaction accelerators, such as tertiary amines, heavy metal salts and alkali and earth alkali compounds. When using polyhydroxyl compounds which in addition to the free hydroxyl groups contain a substantial amount of free carboxyl groups (acid number above 30), the foaming may be effected in the absence of water.

It is possible for fillers and/or plasticizers to be additionally present during the production of the foamed products.

It is possible to replace the above-described copolymers which contain hydroxyl groups by mixtures thereof with polyesters which contain hydroxyl groups, polyester amides, polyglycol ethers, or hydrogenated phenol formaldehyde resins. Thus, up to 50% of hydroxyl polyesters may be used along with the above-described co-

Example 1

320 parts by weight of an ethylene-propylene-carbon monoxide copolymer having an average molecular weight of 2000 and containing 31% of combined carbon monoxide are hydrogenated in acetic ester solution in the presence of 100 parts of Raney nickel at 150° C. The solvent is distilled off and the soft resinous residue containing 5.3% of hydroxyl groups is initially mixed at 45–50° C. with 3 parts of water and then homogeneously with 120 parts by weight of toluylene diisocyanate. The resulting mixture heats up spontaneously and a foamed product of uniform quality having a specific gravity of 0.09 gm./cc. is formed. This product is particularly outstanding because of its excellent resistance to alkali.

Example 2

410 parts by weight of a hydrogenated ethylene-propylene-carbon monoxide copolymer having an hydroxyl content of 9.0% are melted with 410 parts by weight of a polyester containing 7.1% OH, which is derived from 3 mols of adipic acid, 2 mols of 1,3-butylene glycol and 2 mols of trimethylol propane. 8 parts by weight of water, 2 parts by weight of hexahydro-dimethyl aniline, and then 410 parts by weight of toluylene diisocyanate are added to the resulting product. After these additions, the mixture is stirred until it is homogeneous. The mixture heats up spontaneously and a foamed product of uniform quality having a specific gravity of 0.12 gm./cc. is formed. This material is characterized by excellent resistance to saponification and is superior to a foamed product prepared only from the toluylene diisocyanate and the polyester used above.

It was not possible to detect any change after the product had been stored for 48 hours at 70–80° C. in 10% caustic soda solution.

The foamed product can also be produced with the aid of the nozzle apparatus described in U. S. application Serial No. 327,522, filed December 23, 1952, now abandoned.

Example 3

3 parts by weight of water and 0.5 part by weight of hexahydro-dimethyl aniline are added at 50° C. to 320 parts by weight of a catalytically hydrogenated ethylene-propylene-carbon monoxide copolymer having an hydroxyl content of 3.7% and containing 31% of combined carbon monoxide. The mixture thus obtained is stirred until it becomes homogeneous. 100 parts by weight of toluylene diisocyanate are then introduced and the mixture stirred to form a homogeneous oily solution. This solution is poured between vertically disposed plastic plates, only about 1/10 of the volume between the plates being initially filled. Heat is evolved, foaming begins, and a solid reaction product is steadily formed; the space is filled with the foamed product which hardens at room temperature and bonds well to the lateral boundary plates.

Example 4

100 parts by weight of an ethylene-propylene-carbon monoxide copolymer having an average molecular weight of 2100 and containing 30% of combined carbon monoxide are dissolved in 300 parts by weight of dioxane and heated for 5 hours in a stirrer-type autoclave at 110° C. with 50 parts by weight of paraformaldehyde and 2 parts by weight of potassium carbonate. The resulting slightly cloudy solution is filtered and evaporated under reduced pressure. 137 parts by weight of a yellow viscous methylol compound with anhydroxyl content of 7.7% are recovered. 22 parts by weight of this methylol compound are mixed with 0.2 part by weight of water and with 0.1 part by weight of hexahydro-dimethyl aniline and then intimately mixed with 11 parts by weight of toluylene diisocyanate by means of a high-speed stirrer mechanism. Heat is slowly developed in the resulting homogeneous mixture, and after a short time a slightly brownish light substance with uniformly distributed pores is formed.

Example 5

A dioxane solution of 100 parts by weight of a partially hydrogenated ethylene-propylene-carbon monoxide copolymer having an hydroxyl content of 1.8% is heated as described in the preceding example with paraformaldehyde in the presence of potassium carbonate. The product is evaporated under reduced pressure and 132 parts by weight of a viscous yellow resin having an hydroxyl content of 7.8% are obtained.

25 parts by weight of the resinous product prepared in this manner are heated to 50–60° C., then mixed with 0.25 part by weight of water and 0.1 part of hexahydro-dimethyl aniline and then rapidly mixed with 11.5 parts by weight of toluylene diisocyanate to give a homogeneous mixture. Heat is spontaneously evolved, and formaldehyde is gradually liberated and an exceptionally hard and completely colorless foamed product is formed.

Example 6

100 parts by weight of a hydrogenated ethylene-propylene-carbon monoxide copolymer having an hydroxyl content of 4.9% are mixed with 15 parts by weight of propionic acid anhydride and heated for 5 hours at 160° C. with stirring. The mixture is heated for a further 10 hours under reduced pressure at the same temperature; the hydroxyl content drops to 2.1% and the acid number is 4.8.

81 parts by weight of this esterification product are intimately mixed with 0.8 part by weight of water and 17 parts by weight of toluylene diisocyanate and cast in open molds so that only about 1/5 of the volume is filled. The molds are heated for a short time in a drying chamber, after which the entire mold is filled with a light substance which is firmly bonded to the wall of the mold.

Example 7

100 parts of a partially hydrogenated ethylene-propylene-carbon monoxide copolymer having an hydroxyl content of 5.3% are heated for 1 hour at 160° C. with 8 parts of maleic acid anhydride, the heating during the last 10 minutes being carried out under reduced pressure. The viscous resin obtained has an acid number of 42 and an hydroxyl content of 4.5%. 38 parts by weight of this product which contain hydroxyl and carboxyl groups, are mixed with 0.2 part by weight of water and 11 parts by weight of toluylene diisocyanate; a light yellow, rigid, light substance of uniform quality is formed.

Example 8

100 parts by weight of the partially hydrogenated polyketone described in Example 6, which has an hydroxyl content of 4.9%, are mixed with 4 parts by weight of maleic acid anhydride and the mixture heated to 160° C. with stirring. The acid number of the product is 15.9; its hydroxyl content is 3.8%.

45 parts by weight of this polymer which contains hydroxyl and carboxyl groups are mixed with 0.4 part by weight of water and thereafter with 13 parts by weight of toluylene diisocyanate. The mixture is allowed to stand for a short time; a light material is formed which is light yellow in color and which has a specific gravity lower than 0.05 gm./cc. This material is distinguished by being very resistant to alkali.

What is claimed is:

1. A method for making foamed plastics which comprises reacting a composition selected from the group consisting of water and a neutral carbon monoxide-olefine copolymer having terminal hydroxyl groups, water and a carbon monoxide-olefine copolymer having terminal hydroxyl and carboxyl groups and an acid number of not more than 30, and a carbon monoxide-olefine copolymer having terminal hydroxyl and carboxyl groups and an acid number of more than 30 with an organic polyisocyanate having NCO groups in an amount at least equivalent to the sum of the hydroxyl groups, carboxyl groups and water in said composition, said olefine having from 2 to 4 carbon atoms.

2. A method for making foamed plastics which comprises reacting water and a neutral carbon monoxide-olefine copolymer having terminal hydroxyl groups with an organic polyisocyanate having NCO groups in an amount at least equivalent to the sum of the hydroxyl groups and water in said composition, said olefine having from 2 to 4 carbon atoms.

3. The process of claim 2, wherein said copolymer contains from about 5 percent to about 10 percent hydroxyl groups.

4. A method for making foamed plastics which comprises reacting water and a carbon monoxide-olefine copolymer having terminal hydroxyl and carboxyl groups and an acid number of not more than 30 with an organic polyisocyanate having NCO groups in an amount at least equivalent to the sum of the hydroxyl groups and water in said composition, said olefine having from 2 to 4 carbon atoms.

5. A method for making foamed plastics which comprises reacting a carbon monoxide-olefine copolymer having terminal hydroxyl and carboxyl groups and an acid number of more than 30 with an organic polyisocyanate having NCO groups in an amount at least equivalent to the sum of the hydroxyl groups of said copolymer, said olefine having from 2 to 4 carbon atoms.

6. A cellular polyurethane plastic prepared by reacting a composition selected from the group consisting of water and a neutral carbon monoxide-olefine copolymer having terminal hydroxyl groups, water and a carbon monoxide-olefine copolymer having terminal hydroxyl and carboxyl groups and an acid number of not more than 30, and a carbon monoxide-olefine copolymer having terminal hydroxyl and carboxyl groups and an acid number of more than 30 with an organic polyisocyanate having NCO groups in an amount at least equivalent to the sum of the hydroxyl goups, carboxyl groups and water in said composition, said olefine having from 2 to 4 carbon atoms.

7. A cellular polyurethane plastic prepared by reacting water and a neutral carbon monoxide-olefine copolymer having terminal hydroxyl groups with an organic polyisocyanate having NCO groups in an amount at least equivalent to the sum of the hydroxyl groups and water in said composition, said olefine having from 2 to 4 carbon atoms.

8. A cellular polyurethane plastic prepared by reacting water and a carbon monoxide-olefine copolymer having terminal hydroxyl and carboxyl groups and an acid number of not more than 30 with an organic polyisocyanate having NCO groups in an amount at least equivalent to the sum of the hydroxyl groups and water in said composition, said olefine having from 2 to 4 carbon atoms.

References Cited in the file of this patent

UNITED STATES PATENTS

| | | |
|---|---|---|
| 2,441,082 | Pinkney | May 4, 1948 |
| 2,495,292 | Scott | Jan. 24, 1950 |
| 2,577,280 | Simon et al. | Dec. 4, 1951 |
| 2,595,400 | Maynard | May 6, 1952 |
| 2,650,212 | Windemuth | Aug. 25, 1953 |

OTHER REFERENCES

De Bell et al., "German Plastics Practice," 1946, pages 463, 464.